Oct. 19, 1954   W. E. O'SHEI   2,691,790
WINDSCREEN WIPER
Filed Nov. 9, 1950
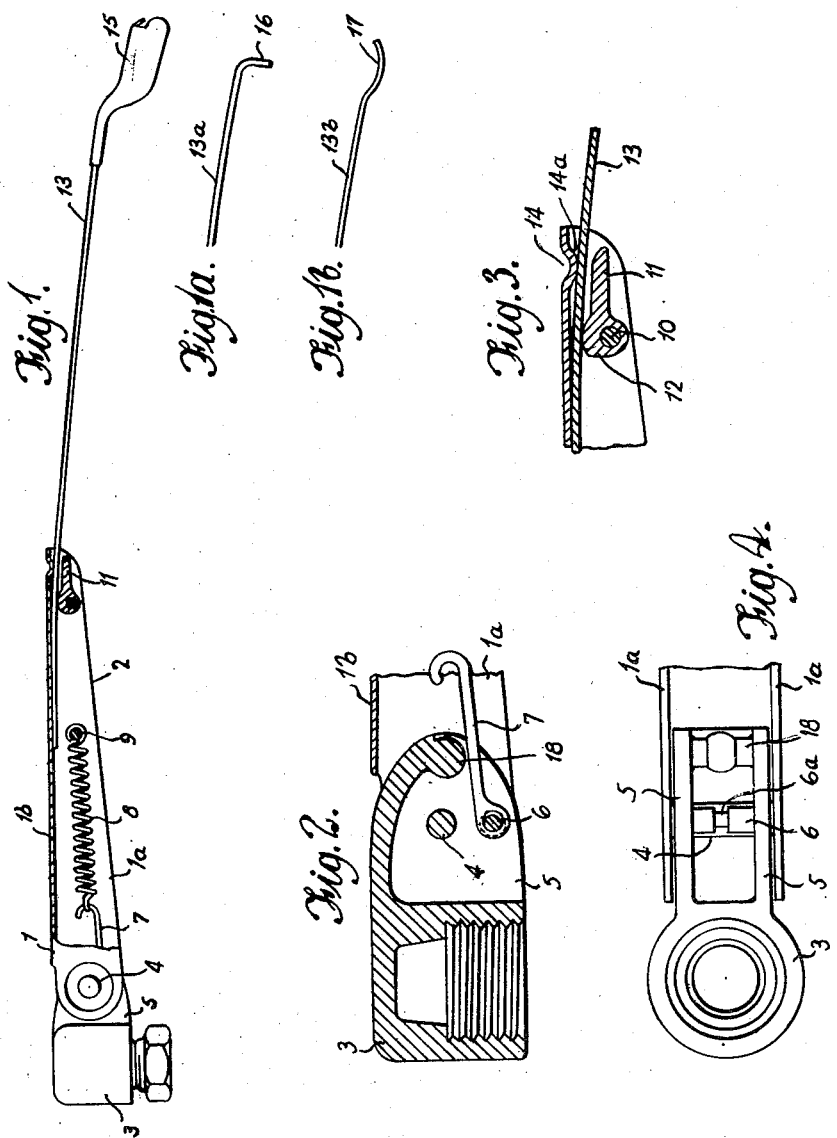
Inventor
William Edward O'Shei
By
O'Boyle & Blair
Attorneys Patented Oct. 19, 1954

2,691,790

UNITED STATES PATENT OFFICE 2,691,790

WINDSCREEN WIPER

William Edward O'Shei, London, England

Application November 9, 1950, Serial No. 194,757

2 Claims. (Cl. 15—255)

The present invention relates to windscreen wipers, and more specifically to an improved wiper arm for carrying the windscreen wiper blade. Such wiper arms have to be made of different lengths to suit different vehicles, and with different blade attaching fittings, which necessitates the supplier carrying a stock of different lengths and types of wiper arm to meet the customers' requirements.

The present invention consists in a windscreen wiper arm which can be assembled by the dealer from two separate parts, one part comprising the arm head which incorporates the collet or other means for securing it to the driving spindle and has the upper portion of the arm pivotally connected thereto in association with a spring for urging this upper portion towards the windscreen, the second part comprising the lower portion of the arm which is formed or provided at one end with the means for connecting the arm with the windscreen blade, the two parts being adapted to be secured together in a simple manner to form the complete arm.

The second part may be made from narrow strip metal and be adapted to fit between the side walls of a channel-shaped stamping from which the upper part of the arm is made.

By means of the present invention the dealer is enabled to build up any desired arm from a head and upper arm part, which is standard for all arms, and the appropriate lower arm part portion of the requisite length and with the requisite blade fitting. If desired the connection between the upper and lower parts of the arm may be such that the lower part may be cut to the required length before assembly with the upper part. This still further facilitates stock problems since by keeping in stock a supply of upper arm parts and a supply of lower arm parts of the maximum required length, shorter arms may be constructed by cutting the lower arm parts to the required length before assembly.

In order that the invention may be more readily understood an embodiment will now be described with reference to the accompanying drawing, in which Fig. 1 is a side elevation, partly in section;

Figs. 1a and 1b show modifications of the free end of the lower arm portion;

Figs. 2 and 3 are similar sections of the inner and outer end, respectively of the upper arm portion, at a larger scale; and Fig. 4 is an underneath plan view corresponding to Fig. 2.

In the illustrated form of the invention, the upper portion 1 of the arm is channel-shaped in cross-section, being open at its back 2, and is hinged to the arm head 3 by a pivot 4 passing through the walls of the channel adjacent one end thereof and ears 5 projecting from the arm head. Also bridging the ears at a point between a stop 18 and the body of the arm head is a pin 6 to which is connected one end of a helical spring 8, the other end of which is connected to a pin 9 bridging the limbs 1a of the channel. The spring 8 thus tends to urge the channel 1 towards the windscreen. The pin 6 is held in position in the ears 5 by the side walls 1a of the channel 1 fitting over the apertures in the ears through which the pin 6 passes. The spring 8 is preferably connected to this pin by a strip metal link 7, which in the illustrated embodiment is located on the pin 6 by a groove 6a in the centre thereof.

Adjacent the free and open end of the channel 1 and pivoted on a pin 10 extending between the walls 1a thereof is a short lever 11 formed integral with a cam 12 surrounding the pivot pin 10. The lower portion 13 of the arm is conveniently made of strip steel of a width which fits within the walls 1a of the channel 1 and is adapted to be clamped therein by the cam 12 when the lever is in its illustrated position in which the raised portion of the cam 12 lies closest to the inside surface of the transverse wall 1b of the channel. In this position the lever 11 preferably extends away from the arm head and lies completely within the channel as illustrated. By raising the lever and turning it in the reverse direction, the cam action on the end of the steel strip 13 is released, and the latter may be moved back and forth to adjust the length by which it projects from the end of the channel 1. It is then locked in the adjusted position by moving the lever 11 back to its clamping position.

The transverse wall 1b of the channel is formed with a transverse groove 14 on its outer surface so as to produce a ridge 14a on the inner surface of the transverse wall at a short distance from the pivot 10 about which the lever turns, between this pivot and the outer end of the channel 1. The steel strip of the lower arm portion 13 is therefore held at a distance from the inner surface of the channel 1, and the pressure applied to the strip 13 by the cam 12 will therefore cause the strip 13 to flex when the lever is moved to the clamping position. Alternatively or additionally to the ridge 14a between the pivot 10 and the outer end of the channel, a similar ridge may be provided between the pivot 10 and the arm head 3, and/or the transverse wall 1b may be provided with a recess or opening opposite the cam 12.

The free end of the steel strip 13 is formed or provided with means for connecting the arm with the windscreen wiper blade, several examples of such means being illustrated at 15, 16 and 17 in Figs. 1, 1a, 1b respectively.

With the construction described, the length of the arm is not only adjustable but the lower arm portion 13 can be removed and replaced by another lower arm portion such as 13a, 13b having a different blade attaching means at its free end.

Whilst it is preferred that the lower portion of the arm should be separable from the upper portion, it will be realised that adjustment of the length of the arm can be obtained with the arrangement described even if the lower arm portion is so formed that it cannot be completely withdrawn from the upper arm portion.

I claim:

1. A windscreen wiper arm comprising an arm head which incorporates means for securing the head to a driving spindle, an inner arm portion of channel-shaped cross-section pivotally connected to the arm head, a spring acting between said inner arm portion and the arm head for urging the inner arm portion towards a windscreen when the head is mounted on the driving spindle, a metal strip constituting an outer arm portion which is provided at its free end with means for connecting it to a windscreen wiper blade and is adapted to slide within the channel of the inner arm portion, a lever pivoted for swinging movement between the side walls of the channel of the inner arm portion and about an axis transverse to said side walls, said lever having an eccentric cam portion between which and the inner surface of the base of the channel the metal strip is located, said eccentric cam portion being movable by the lever to a position in which the metal strip is clamped within the channel-shaped inner portion, and a ridge formed on the inner surface of the base of the channel and positioned longitudinally of the channel away from the cam whereby the metal strip is spaced from the base of the channel at the point opposite the cam and the clamping action of the cam causes the strip to be flexed.

2. Apparatus as claimed in claim 1, wherein the ridge is positioned between the cam and the outer end of the channel.

References Cited in the file of this patent

UNITED STATES PATENTS

| Number | Name | Date |
| --- | --- | --- |
| 1,918,519 | Clements | July 18, 1933 |
| 2,087,178 | Zaiger | July 13, 1937 |
| 2,350,134 | Smulski | May 30, 1944 |
| 2,392,670 | Horton | Jan. 8, 1946 |
| 2,528,253 | Zaiger | Oct. 31, 1950 |
| 2,531,889 | Oishei | Nov. 28, 1950 |

FOREIGN PATENTS

| Number | Country | Date |
| --- | --- | --- |
| 665,362 | Great Britain | Jan. 23, 1952 |